Patented Feb. 6, 1951

2,540,669

UNITED STATES PATENT OFFICE 2,540,669

PROCESS FOR THE ISOLATION OF PROTEINS

Sherburne Bryant Henning, Evanston, Ill.; Pearl Henning, administratrix of said Sherburne B. Henning, deceased, assignor to Pearl M. Henning No Drawing. Application February 6, 1947, Serial No. 726,959

4 Claims. (Cl. 260—123.5)

The present invention relates to the isolation of the proteins, and more particularly to the isolation of proteins from oleaginous protein bearing seeds such as the soybean, peanut and cottonseed, and in the novel method of rapid settling and clarification of the alkaline solutions of such proteins during the process of their isolation. Soybean protein, isolated from the defatted soybean meal, flakes or flour, finds extensive use in the manufacture of coated paper, leather finishing, plastics, etc., and is frequently used in place of milk casein. In fact, in numerous industries it is preferred to casein because of its less vigorous reaction with formaldehyde and its somewhat less odoriferous nature.

Soybeans are being grown in ever increasing quantities, and due to the fact that they are readily available and their market price does not fluctuate from year to year as does that of casein, soybeans are a most valuable source of supply of protein for industrial purposes.

The extraction of protein from the soybean is generally accomplished after the oil has been removed either by pressing the flaked beans or by its extraction with volatile solvents. However, the extraction of this protein has previous to the present invention, been a highly complicated process and has involved a multiplicity of steps and required the use of very expensive and extensive plant equipment including batteries of stainless steel tanks, glass lined tanks, centrifuges, vacuum dryers and the like. Because of the expensive and extensive plant equipment required, the isolation of soybean protein has not been accomplished upon the extensive scale that this important product bears to the industry.

Among the objects of the present invention is to provide a simple and relatively inexpensive method of isolation of industrial protein from oleaginous protein bearing seeds, with a minimum of chemical control and requiring a minimum of equipment. Due to this simplicity and small amount of equipment necessary, my invention is particularly adapted to employment in numerous plants, and especially in manufacturing plants built originally for the production of casein and which plants may now be readily converted to isolating the proteins by the use of their present equipment and without delay.

A further object of my novel invention is to provide novel means and manufacturing methods whereby the production of soybean protein may be expedited and the quantity of its production may be greatly enhanced whereby to make it readily available to the entire industry, thereby relieving the difficulties now encountered due to the shortage of milk casein.

A still further object of the invention is to produce a protein of lighter color, better solubility, higher bonding strength, and one with less objectionable odor than that now obtainable.

Another important object of this invention is to provide a novel means and method of increasing the yield of protein from a given amount of meal.

Further objects are to provide a novel process of maximum simplicity, efficiency and ease of operation, and such further objects, advantages and capabilities as will later more fully appear and are inherently possessed thereby.

In the isolation of soybean proteins or the like, the soybeans are cleaned and the oil is extracted by pressing or with volatile solvents. Generally the beans are flaked before the oil is extracted. The defatted flakes are then treated with acid water to remove the soluble sugars, legumin and proteose which are not desired in the finished product. The acid wash water is then drained off and the tank is filled to approximately the original volume with fresh water. The proteins are next dissolved with alkali and the insoluble impurities are separated from the alkaline solution of the proteins. Next the clear alkaline solution of proteins is precipitated with acid. Then the whey is drained off and the curd is pressed to remove excess water, dried and ground to suitable fineness.

Although numerous methods have been employed in an endeavor to isolate the proteins, such as the pre-treatment with acid, dissolving the washed material in alkali and then subsequent precipitation with acid, great difficulty has been encountered in such efforts to separate the insoluble impurities from the alkaline solution of the proteins, particularly since numerous of these impurities have different physical and chemical properties which make them particularly difficult to separate from the alkaline solution. In such prior methods, after the soybean defatted flakes have been acid leached to remove sugars, legumin and proteose, and the acid wash water drained off, the original volume is made up with fresh water and alkali, usually sodium hydroxide, in an endeavor to dissolve the proteins. When the caustic soda is added, the proteins immediately dissolve into a yellowish solution, but the voluminous suspensions of hemicellulose and other impurities remain insoluble in the liquid.

Gummy substances go into solution in the form of a colloidal or mucilaginous suspensoid. Galactans composing the cell walls, swell up by absorbing water and mechanically remove to form a bulky suspensoid. These mechanically suspended impurities are very bulky and mucilaginous and will not settle from the solution. Furthermore, the protein solution helps to keep these impurities suspended by acting as a protective colloid.

To separate these impurities from the protein solution is extremely difficult. If the solution is filter-pressed, the liquid comes clear at first, but the gummy and mucilaginous impurities rapidly choke up the interstices of the filter cloth, making it impervious to the further passage of the liquid. If the liquid is pumped through under high pressure, the liquid passes through without being filtered. Centrifuging, although somewhat helpful, is a slow and tedious operation where large volumes of the liquid must be treated, and furthermore, centrifuges are expensive and a great many are required for large production.

The present invention contemplates a novel, cheap and effective manner of removing these gummy impurities. This may be accomplished using equipment now readily available or easily obtainable. In casein manufacturing plants all the necessary equipment for practicing my invention is now available, with the possible exception of a small rotary pump with the necessary hose connections for transferring liquid from one vat to another.

I have found that the addition of an acetate, preferably sodium acetate, to the alkali used for dissolving the proteins, causes the gummy and mucilaginous impurities which are held in suspension to flock or agglomerate quite rapidly into large flocks or agglomerates which settle promptly to the bottom of the vat, allowing the clear solution of the proteins to be decanted off or siphoned off and transferred to an adjoining vat for later precipitation with acid. Heating the liquid to approximately 130° F. increases the agglomeration. The resulting supernatant solution of proteins is quite clear.

I have also found that highly satisfactory results may be obtained by employing ammonium acetate in place of sodium acetate, in whole or in part.

As one example of my novel process, excellent results have been secured by use of the following procedure:

Approximately 100 pounds of defatted soybean meal, flakes or flour are mixed thoroughly with approximately 1500 pounds of cold water and stirred for about 10 minutes. Vats of wood or other suitable or available material may be used for this purpose, preferably in units of two with one placed high enough above the other to allow for siphoning of the liquid from the higher one into the lower vat. Where adjoining vats are now available and these vats are fixed in position at the same or approximately the same level, a small rotary pump with suitable hose connections may be used to pump the liquid from one vat into the other. The vats are preferably heated by any suitable means such as steam or hot water pipes arranged preferably along the bottom. An acid, preferably dilute acetic acid, is added and the aggregate or mix thoroughly stirred until a pH of about 4.7 is reached. The vat is heated to approximately 130° F. to promote better settling of the solids. If meal or flakes are used instead of flour, small amounts of the acid will probably have to be added from time to time to maintain the pH as the coarser particles take up the acid gradually. If flour is the starting material, the pH can be adjusted almost at once for the acid penetrates through the small particles rapidly and the proper pH is quickly arrived at, and no further acid need be added. It may also be advisable when starting with flour or comminuted material, to use more water. For example, approximately 2500 pounds of cold water in place of the previously mentioned 1500 pounds may be used because the amount of protein extracted from flour per pound is substantially greater than that extracted from flakes or meal, due primarily to the difference in particle size. As meal or flakes are cheaper than the flour, in order to save expense, I prefer to take the meal or flakes and grind them to about 70 mesh to thereby effect better extraction and greater yield per pound of initial material. The acid pH to be maintained may be varied within a relatively narrow range, it being desired to reach the isoelectric point of the proteins. A slightly higher or lower pH will do no harm, but if it is higher or lower than approximately 4.7, some protein may dissolve into the wash water and be lost when decanting, thereby lowering the yield. The desired point is that arrived at when some of the warm acid liquid placed in a beaker and allowed to settle for a few minutes, leaves a clear supernatant liquid when the solids have settled.

The aggregate in the vat is now allowed to settle, and the acid wash water is discarded. The original volume is then made up with fresh water. Approximately 2½ pounds of sodium acetate of about 60% dry strength, commonly called sodium acetate crystals are now added. As previously mentioned, ammonium acetate may be employed in place of sodium acetate in whole or in part. This acetate is stirred into the mixture and to this mixture is then added dilute sodium hydroxide solution in an amount sufficient to raise the pH to about 9.0. Stirring is continued until the proteins are dissolved, which requires generally about 15 to 20 minutes, except when the starting material is very coarse. Heat up to 130° F. may be used to help dissolution of the protein.

Approximately 5 pounds of hydrated lime made into a cream with about 10 pounds of water is stirred into the mixture to precipitate the lime insoluble protein. This lime insoluble protein apparently precipitates on the flocks of impurities, causing these flocks to become denser and of higher specific gravity, thereby enhancing the rate of settling. After vigorous stirring, approximately 2½ pounds of barium peroxide which has been wetted thoroughly with approximately 5 pounds of water, is stirred into the mixture for the purpose of bleaching and reducing the viscosity of the proteins. The entire mix is then allowed to settle.

The coarse flocks of impurities settle rapidly, and this settling time will be dependent upon the degree of fineness of the starting material, being more rapid if flour or finely ground material is initially used, and slower if flakes are initially employed. The rate of settling is also influenced by the ratio of water to starting material. Precipitates of this nature settle more rapidly if the concentration of protein in solution is decreased. Settling will normally require from approximately ½ hour to 4 hours, although there is no harm in allowing settling for a greater period of time, for example over night.

The clear supernatant solution of protein is now pumped or siphoned into an adjacent vat where it is heated to approximately 130° F., and an acid, preferably dilute hydrochloric acid is slowly added with good stirring until the pH is about 5.6. As previously stated, the iso-electric point of the protein is the objective. The proper point at this state of the process is highly important, not only to get the maximum yield, but to get the precipitated curd into the best possible physical state for later draining off the whey or acid water, and the pressing out of excess water by pressure. The operator can readily arrive at the proper pH for securing the best draining and water removal with his particular equipment. This procedure is quite similar to that used in the so-called "grain curd method" of precipitating casein from skim milk, which is well known in the industry.

The curd is now allowed to settle and the whey is siphoned or pumped from the top down to the surface of the settled curd. The excess water may be drained through a gate valve covered with canvas, the operator moving the curd away from the gate valve now and then with any suitable means to facilitate easy flow of the whey. The curd is then pressed in a curd press to remove as much water as possible, and is then aged in the curd form to allow the bleach to act. The barium peroxide releases its available oxygen when in contact with the acids, and since the curd is now acid, nascent oxygen permeates the curd, bleaching it and also reducing the viscosity of the protein curd at the same time. The time allowed for the bleaching and viscosity reduction will depend upon the physical properties of the finished protein that is desired. Employing the amount of barium peroxide as above specified, the aging time will run from approximately 12 to 48 hours, it being understood that a protein of high viscosity is produced by shorter aging, and a protein of lower viscosity by longer aging. To set the aging at the desired point, the operator can take out a sample of the curd at intervals, dry it at a maximum temperature of 100° F. in vacuum or over calcium chloride in a desiccator, grind and dissolve in soda ash. He will then judge the color and viscosity, and when the color and viscosity desired are arrived at, the curd from the bath can be dried at once to avoid further change. After the curd has been dried, it is ground to suitable fineness, usually about 70 to 80 mesh, and constitutes the isolated soybean protein of commerce.

It will be seen from the above description that in my invention the clarification, the rapid settling of impurities, the production of the alkaline solution of the proteins, the elimination of the lime-insoluble protein, the bleach and viscosity reducer are all combined in one solution and provide a simple, inexpensive method which formerly required many operations and transfers from tank to tank, centrifuges and other expensive equipment.

Although I have given by way of illustration an example and approximate proportions of ingredients employed, it is to be understood that the invention is not limited thereto but comprehends other proportions, ingredients and features without departing from the spirit of the invention. For example, although I have mentioned acetic acid as employed in the preliminary acid leach, it is to be understood that other acids, including sulfuric, hydrochloric or sulfurous may be employed. I have found that acetic acid gives a good clear acid wash water and the resulting protein is of excellent quality.

For example, I have also mentioned heating to a temperature of approximately 130° F. as the temperature for the acid leach, but it is to be understood that higher temperatures may be employed, especially if it is desired to eliminate the heat sensitive proteins which constitute about 7% of the initial material. If this elimination is desired, a temperature of approximately 180 to 185° F. may be employed, but the yield may be somewhat less.

I have mentioned the use of sodium acetate to promote flocking and agglomeration of the mucilaginous and gummy impurities, but other acetates, including potassium acetate, may be employed, the important factor being that the acetate is combined in such a way that a clear supernatant liquid results. The amount of sodium acetate employed is preferably within the range of approximately 1 to 5% of the weight of the starting or initial material, although further variation would not seriously affect the results produced. In other words, more than 5% could be employed, but it would result in a too great percentage of sodium ions to be neutralized later by the subsequent precipitating acid.

Again, although I specify that sodium hydroxide may be employed as the alkaline solvent for the proteins, it is to be understood that other hydroxides, including potassium hydroxides and other alkalis such as sodium sulfite, may be used. Sodium hydroxide does have the advantage of being relatively cheap.

Although barium peroxide has been mentioned as the bleach and viscosity reducer, other oxydizing agents, including sodium peroxide, hydrogen peroxide, etc., may be employed. However, barium peroxide, because of its cheapness and availability on the market, is preferred. In addition, it gives a lighter color to the finished protein, results in a protein with practically no odor and one having a high degree of strength for coating paper.

Although I have mentioned sodium peroxide, I have secured best results by the use of barium peroxide since when the former is used, its main action will be in the alkaline protein solution because its available oxygen is released upon the addition of water, and the curd does not have to be aged for the bleaching and viscosity reduction takes place in the alkaline solution and the precipitated acid curd will be soft and somewhat plastic due to the viscosity reduction which has already been effected. Due to the plasticity and water holding nature of the curd when sodium peroxide is used, great difficulty is encountered in handling it, whereas when barium peroxide is used, a relatively hard curd results.

Hydrogen peroxide can also be used in the alkaline solution, but it is relatively expensive and commercial shipments vary in strength, making its use uncertain quantitatively. It further has the disadvantages mentioned above with the use of sodium peroxide.

The pH of the alkaline solution of the proteins may be higher or lower than 9.0 and still produce good protein, but I have found that too high an amount of alkali will produce a darker finished product and will have a tendency to degrade the protein molecule by alkaline hydrolysis.

I have therefore found that it is most advantageous to use the least amount of alkali that will dissolve the proteins effectively, and that a pH of 9.0 gives excellent results without any degradation in color or strength.

This application is a continuation-in-part of my copending application Serial No. 512,066, filed November 27, 1943, issued as Patent No. 2,415,426, on February 11, 1947.

What I claim is:

1. In the process of isolating proteins from oleaginous protein bearing seeds, the steps of adding ammonium acetate and an alkali to dissolve the proteins, adding an oxidizing agent of the group consisting of a peroxide of barium, sodium and hydrogen to bleach and reduce the viscosity of the proteins, warming the aggregate to speed the agglomeration of the impurities, settling out the impurities, decanting the clear protein solution, precipitating the protein at approximately its iso-electric point, and removing the excess water from the protein.

2. In the process of isolating proteins from soybeans by leaching material of the group consisting defatted meal, flakes and flour with water and acetic acid at approximately the iso-electric point of its proteins, warming the aggregate to approximately 130° F. to promote settling, settling the solids, decanting the wash water, adding water to approximately the original volume, adding ammonium acetate and sodium hydroxide to dissolve the proteins, adding lime to precipitate the lime insoluble proteins, adding barium peroxide to bleach and reduce the viscosity of the proteins, warming to approximately 130° F. to speed the agglomeration of the gummy and mucilaginous impurities, settling these impurities, decanting the clear protein solution, precipitating the protein with hydrochloric acid at approximately the iso-electric point of the protein, and removing excess water from the protein curd.

3. The process of clarifying and settling the gummy and mucilaginous bulky impurities from aqueous alkaline solutions of material of the group consisting of defatted meal, flakes and flour of soybeans by adding ammonium acetate to such solutions, warming to further aid in agglomeration and settling of such impurities, and decanting the clear protein solution.

4. The process of clarifying and settling the gummy and mucilaginous bulky impurities from aqueous alkaline solutions of material of the group consisting of defatted soybean meal, flakes and flour by adding to the solutions approximately 1 to 5% of ammonium acetate based on the weight of the meal, flakes or flour employed and warming to approximately 130° F. to further aid in settling and agglomeration of such impurities.

SHERBURNE BRYANT HENNING.

REFERENCES CITED

The following references are of record in the file of this patent:

UNITED STATES PATENTS

| Number | Name | Date |
|---|---|---|
| 1,755,531 | Beaufour | Apr. 22, 1930 |
| 1,866,698 | Bronsztajn | July 12, 1932 |
| 1,955,375 | Cone et al. | Apr. 17, 1934 |
| 2,233,439 | Wahlforss | Mar. 4, 1941 |
| 2,238,329 | Julian et al. | Apr. 15, 1941 |
| 2,246,466 | Julian et al. | June 17, 1941 |
| 2,260,640 | Rawling et al. | Oct. 28, 1941 |
| 2,274,983 | Hieronymus | Mar. 3, 1942 |
| 2,284,700 | Wahlforss | June 2, 1942 |
| 2,331,619 | Morse | Oct. 12, 1943 |
| 2,415,426 | Henning | Feb. 11, 1947 |